Sept. 15, 1959 A. COTSWORTH III 2,904,627

SIGNAL-TRANSLATING APPARATUS

Filed Oct. 25, 1956 2 Sheets-Sheet 1

INVENTOR.
Albert Cotsworth, III
BY John J. Pederson
Attorney

Sept. 15, 1959 A. COTSWORTH III 2,904,627

SIGNAL-TRANSLATING APPARATUS

Filed Oct. 25, 1956 2 Sheets-Sheet 2

INVENTOR.
Albert Cotsworth, III
BY John J. Pederson
Attorney

United States Patent Office 2,904,627

Patented Sept. 15, 1959

2,904,627

SIGNAL-TRANSLATING APPARATUS

Albert Cotsworth III, Oak Park, Ill., assignor to Zenith Radio Corporation, a corporation of Delaware Application October 25, 1956, Serial No. 618,205

4 Claims. (Cl. 178—5.8)

This invention relates to signal-translating apparatus and more particularly to an improved amplifier for use in a television receiver.

The invention finds great utility in any system where it is desired to vary the gain of an amplifier in response to the strength of received signals having frequencies falling within the acceptance range or pass-band of the amplifier and where it is further desired to alter the amplifier response in certain selected portions of the pass-band upon the occurrence of a particular change in the incoming signal strength. However, the immediate application of the invention is to a television receiver of the intercarrier-sound type and, accordingly, it will be described in that environment.

In an intercarrier-sound receiver, the video and sound intermediate-frequency components derived from a received television signal are translated through a common intermediate-frequency amplifier, and both are supplied to the video detector. Present-day transmission standards require that a radiated television signal include a first carrier wave amplitude-modulated with video information and a second carrier wave frequency-modulated with the sound information and always frequency-displaced 4.5 megacycles from the first carrier wave. In a typical present-day receiver, the incoming composite television signal is translated to the intermediate-frequency amplifier through a tuner which is adjustable by the viewer through the means of what usually is called a fine tuning control to dispose the converted sound and video carriers at points on the intermediate-frequency amplifier response-characteristic that yield a satisfactory picture at the receiver output. Under ordinary conditions, the adjustment by the viewer gives satisfactory reproduction of both sound and video information. This is because the response characteristic of the amplifier is designed and adjusted to have a frequency-width sufficient to accommodate both converted carriers. Typically, the width of this pass-band approximates 4.5 megacycles, so that, when the fine tuning control is properly adjusted, the converted carriers fall on opposite skirts of the amplifier response-characteristic. Furthermore, for best operation, the pass-band is adjusted so that the sound carrier normally falls well down on the skirt and thus very near one end of the pass-band. Beyond the ends of the pass-band, the amplifier response usually is attenuated rather sharply in order to prevent interference from the carriers transmitted in adjacent television channels. With respect to the side of the pass-band on which the sound carrier is received, a trap frequently is provided and is tuned to the adjacent-channel video carrier frequency.

It has been found that the above described arrangement can lead to difficulty in areas of weak signal reception. The reason for this lies in the natural tendencies of the viewer to adjust the fine tuning control to the point at which he sees the most satisfactory image on his cathode-ray tube screen. However, under very weak signal conditions, this most satisfactory image reproduction often is obtained at the expense of actually mis-tuning the receiver so as to move the video carrier inwardly and to a higher gain portion of the amplifier response characteristic, which at the same time moves the sound carrier outwardly of the pass-band to a point where the sound amplification is too low to result in proper sound reproduction.

It is accordingly an important object of the present invention to provide an improved intermediate-frequency amplifier which contributes significantly to the attainment of proper sound reproduction even though the receiver is intentionally de-tuned at the time in order to obtain optimum picture reproduction during the reception of television signals having a weak signal strength.

It is another object of the present invention to provide an improved intermediate-frequency amplifier which boosts its response at frequencies to which the sound carrier may be de-tuned during periods when the received signal strength is very weak.

It is a more detailed object of the present invention to provide an improved intercarrier amplifier having a response characteristic shaped to accept a sound carrier wave of a selected frequency on one skirt of its pass-band and which, upon the occurrence of a decrease in received signal strength, boosts its response in the vicinity of a frequency displaced away from the selected frequency by a predetermined amount in a direction away from the center of the pass-band.

Still another object of the invention is to provide an improved amplifier which, upon the occurrence of a decrease in signal strength, substantially reduces its response in one portion of its response characteristic while boosting its response in another, higher frequency portion of its response characteristic.

The present invention provides signal-translating apparatus having a response characteristic with a pass-band for accepting a selected radio-frequency carrier-wave. The system includes an amplifying device having a selected normal gain at one frequency and having input and output signal circuits; means for varying the gain of the amplifying device inversely with variations in the received signal strength; and a frequency selective network connected in common with at least portions of the input and output signal circuits, coacting with the amplifying device, and responsive to the gain-varying means, for boosting the amplifier response at a second frequency displaced away from the one frequency. More particularly as applied to signal-translating apparatus for amplifying a composite television signal which includes video-components amplitude-modulated on a first carrier-wave and sound-components frequency-modulated on a second carrier-wave always frequency-displaced from the first carrier-wave by a selected amount, the apparatus includes an amplifier comprising an amplifying device having an input signal circuit adapted to receive the composite television signal and an output signal circuit. This amplifier has a response characteristic with first and second portions for respectively accepting the first and second carrier-waves. Means responsive to variations in the strength of the television signal is connected in the input circuit for varying the gain of the amplifying device inversely with the signal strength variations. Connected in common with the input and output circuits is means which, upon the simultaneous occurrence of a decrease in the signal strength and a de-tuning of the apparatus to displace the second carrier-wave in a given direction away from the center of the response characteristic, coacts with the responsive means and the amplifying device to boost the response of the amplifier in the second portion of the response characteristic and for decreasing the response of the amplifier at a frequency spaced in the given direction by a predetermined frequency interval beyond the displaced second carrier-wave frequency.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures, and in which:

Figure 1:
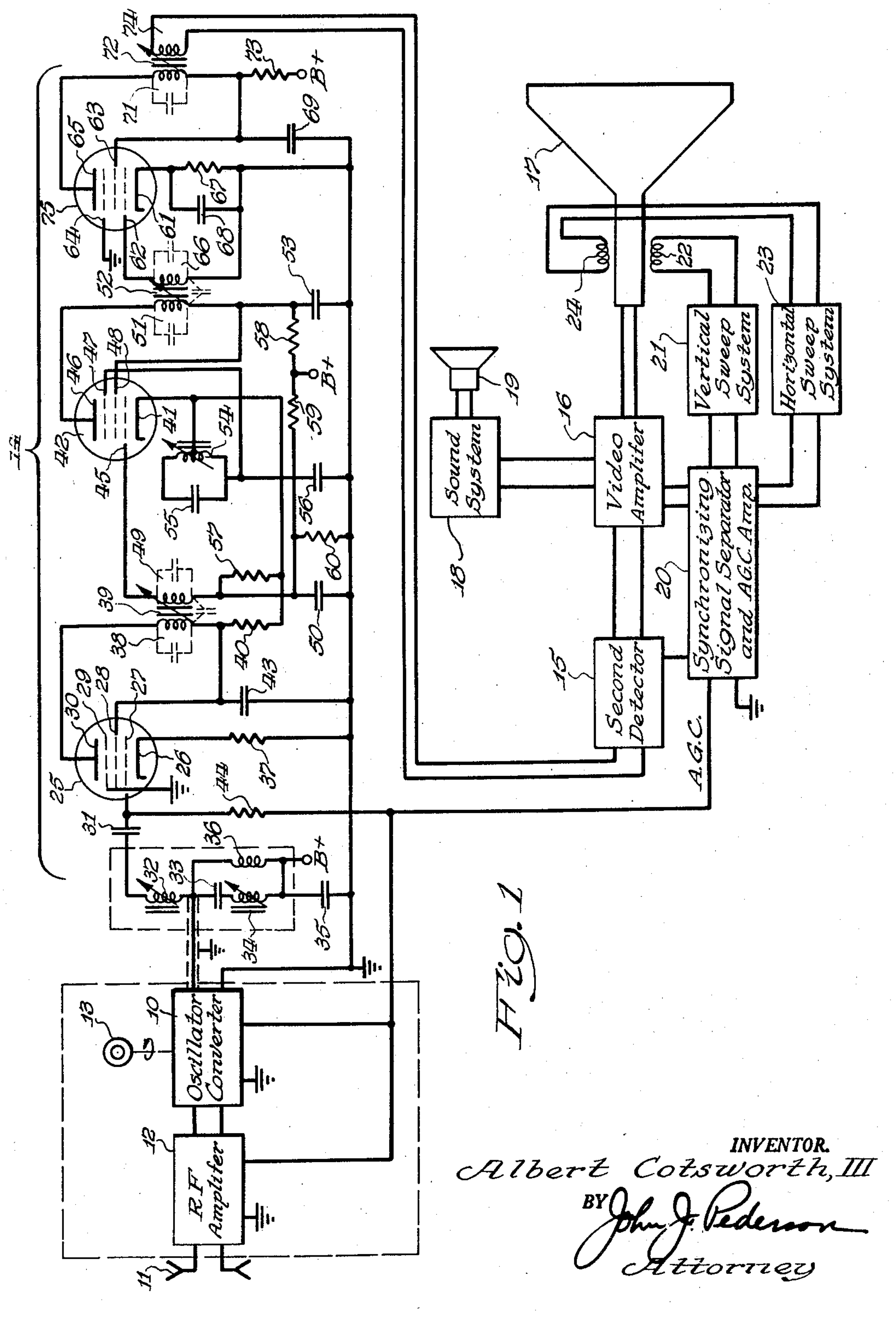
Figure 1 is a schematic representation of a television receiver including an intermediate-frequency amplifier constructed in accordance with the present invention.

The television receiver of Figure 1 comprises an oscillator-converter 10 for converting a composite television signal, intercepted by an antenna 11 and amplified by a radio-frequency amplifier 12, to intermediate-frequency sound and video signals. Oscillator-converter 10 includes a fine tuning control 13, conventionally a part of the channel selector knob assembly. The intermediate-frequency sound and video signals are together amplified in an intermediate-frequency amplifier 14 and are demodulated by a second-detector 15. The detected composite sound and video signals are translated through a video amplifier 16 from which the amplified video signals are impressed on the input circuit of an image-reproducing device, such as a cathode-ray-tube 17. Intercarrier sound signals are taken from the video amplifier 16 and applied to a sound system 18 which may include a frequency discriminator followed by one or more stages of audio amplification. The audio-frequency output signals from sound system 18 are impressed on a loudspeaker 19 or other sound-reproducing device.

Composite video signals from video amplifier 16 and from second detector 15 are also applied to a synchronizing-signal separator and automatic gain control amplifier 20, where line-frequency synchronizing-signal pulses and field-frequency synchronizing-signal pulses are separated from the video-frequency components. Field-frequency output pulses from synchronizing-signal separator 20 are applied to a vertical sweep system 21, the output of which is coupled to the appropriate deflection coils 22 associated with image-reproducing device 17.

Line-frequency synchronizing-signal pulses from synchronizing-signal separator 20 are applied to a horizontal sweep system 23 which is utilized to provide line-frequency deflection current for the appropriate deflection coils 24 associated with image-reproducing device 17.

Synchronizing-signal separator and automatic gain control amplifier 20 also produces an automatic gain control potential which is applied to radio-frequency amplifier 12, oscillator-converter 10, and intermediate-frequency amplifier 14. Synchronizing-signal separator and automatic gain control amplifier 20 may be of any known construction; a particular circuit for performing these functions is described and claimed in the copending application of Robert Adler et al., Serial No. 568,049, filed February 27, 1956, and assigned to the same assignee as the present invention. Suffice it to say that the automatic gain control potential varies inversely with variations in strength of the received television signal, which function of an automatic gain control system is well known in the prior art.

With the exception of intermediate-frequency amplifier 14, the construction and operation of the receiver of Figure 1 form no part of this invention and may therefore be entirely in accordance with conventional practices in the art. The invention is not limited to application in a receiver of the type shown in Figure 1, but may be utilized to advantage in any system wherein it is desired to provide a disproportionately large boost in a selected portion of the response characteristic of a signal amplifier upon the occurrence of an increase in the gain or transconductance of the amplifying device.

While intermediate-frequency amplifier 14 may take various forms, in the embodiment of Figure 1 it comprises three amplifier stages. The first stage includes an amplifying device in the nature of an electron-discharge device 25, preferably of the conventional pentode type having a cathode 26, a control-grid 27, a screen-grid 28, a suppressor-grid 29 and an anode 30. Control-grid 27 is coupled to oscillator-converter 10 through a coupling capacitor 31 and an inductor 32. At its input, inductor 32 is connected to ground through a condenser 33, an inductor 34, and a condenser 35. The positive terminal of a direct-current power supply, conventionally indicated as B+, is connected through an inductor 36 to a common connection between inductor 32 and capacitor 33 for supplying operating voltage to oscillator-converter 10. The supply end of inductor 36 is connected between inductor 34 and condenser 35. Cathode 26 is connected to ground through a resistor 37, and suppressor grid 29 is connected directly to ground. Anode 30 is connected in series with the primary winding 38 of an interstage coupling transformer 39 and through a resistor 40 to the common electrode or cathode 41 of a second stage amplifying device 42. A by-pass condenser 43 is connected at one end between primary winding 38 and resistor 40 and at its other end to ground. The one end of by-pass condenser 43 also is connected to screen grid 28. The automatic gain control potential is led in from synchronizing separator and automatic gain control amplifier 20 through a resistor 44 to control-grid 27.

The second stage amplifying device 42 is provided with an input electrode 45, an output electrode 46, and common electrode 41; preferably it is an electron-discharge device having a suppressor-grid 47, and a screen-grid 48, as well as input control-grid 45, output anode 46, and cathode 41.

An input signal path for amplifying device 42 extends in part from input electrode 45 through the secondary winding 49 of transformer 39 and a capacitor 50 to ground. An output signal path extends in part from anode 46 through the primary winding 51 of an interstage coupling transformer 52 and a condenser 53 to ground. Completing these input and output signal paths, cathode 41 is connected to ground through a parallel-resonant network comprising an inductor 54 and a capacitor 55, both connected at one end to ground through a condenser 56; cathode 41 is connected to the midpoint of inductor 54, and suppressor grid 47 is connected to a point between the parallel-resonant network and capacitor 56.

Cathode 41 also is connected through a resistor 57 to a point between secondary winding 49 and condenser 50, to which point is also connected the midpoint of a voltage divider comprising resistors 59 and 60 connected between B+ and ground. A resistor 58 is connected at one end between primary winding 51 and capacitor 53 and at its other end to B+. Screen grid 48 is connected to a point between primary winding 51 and condenser 53. The value of capacitor 53 preferably is selected to provide screen neutralization in the second stage; that is, this value is selected to substantially balance the bridge formed with cathode 41, control grid 45, anode 46, and screen grid 48 at its four corners. So operated, the principal output circuit signal path extends from anode 46 through primary winding 51 to screen grid 48. However, output signal currents also flow in the cathode circuit through the frequency-selective network of capacitor 55 and inductor 54; hence, the output signal circuit is herein defined to include in one of its parts the frequency-selective network, it being noted that the network is also part of the input signal circuit.

The third stage is entirely conventional and comprises an amplifying device 75 in the form of an electron-discharge device of the pentode type having a cathode 61, a control-grid 62, a screen-grid 63, a suppressor-grid 64 and an anode 65. Control-grid 62 is connected in series with the secondary winding 66 of transformer 52 and a resistor 67 to cathode 61. Resistor 67 is by-passed by a condenser 68. Screen-grid 63 is connected to ground through a condenser 69, while suppressor-grid 64 is connected directly to ground. Anode 65 is connected through the primary winding 71 of an interstage coupling transformer 72 and a resistor 73 to B+. Screen grid 63 also is connected to B+ through resistor 73. Resistor 67 is connected to ground at its end remote from cathode 61. A secondary winding 74 of transformer 72 is connected to second detector 15.

In the preferred embodiment, interstage transformers 39, 52 and 72 are preferably of the so-called slug-tuned type. It will be appreciated that tuning of these windings is accomplished in cooperation with the distributed capacitance present across and between the windings and in the circuit, which distributed capacitance has been shown in the drawings in phantom as condensers connected directly across each of the respective windings. It will be understood that tuning of these transformers may alternatively be accomplished by means of variable capacitors in combination with fixed inductive windings.

With the exception of the parallel-resonant network comprising inductor 54 and capacitor 55, the above described intermediate-frequency amplifier is of a previously known design. As is customary, the various transformers and inductors are stagger-tuned to provide an overall response characteristic of amplifier 14 suitable for passing the composite television signal; that is, each of the three stages is most responsive to a different portion of the pass-band in order to obtain the desired overall response. Preferably, the parallel resonant network 54—55 is incorporated in the stage designed to emphasize the low frequency or sound carrier end of response characteristic. When properly adjusted, the response characteristic of amplifier 14 may appear as shown in the typical intermediate-frequency amplifier response curve 76 of Figure 2. In this curve, the relative response or gain of the entire amplifier is plotted as a function of signal frequency. In common parlance, the outer, steeply sloping portions 77, 78 of such a response curve are known as skirts.

Figure 2:
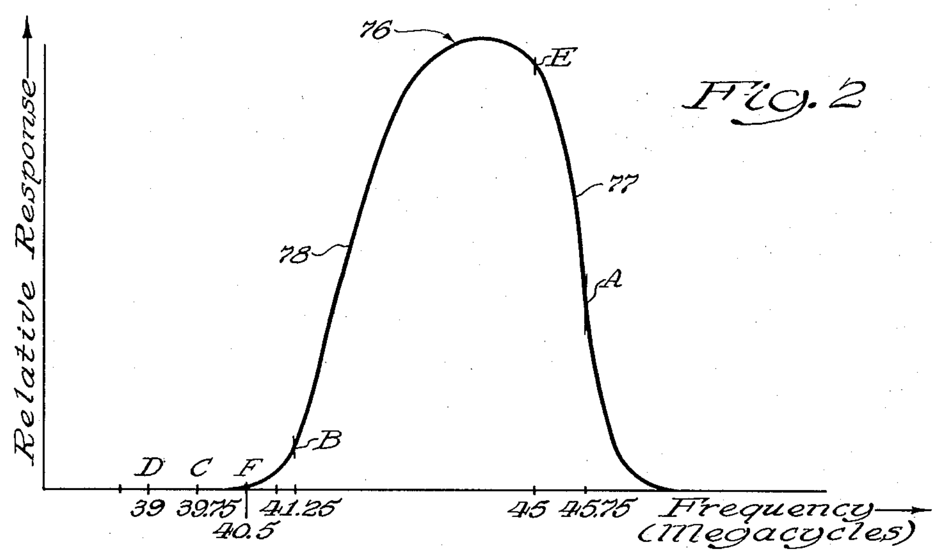
Figure 2 is a curve illustrating a typical response characteristic of the amplifier shown in Figure 1.
Figure 3:
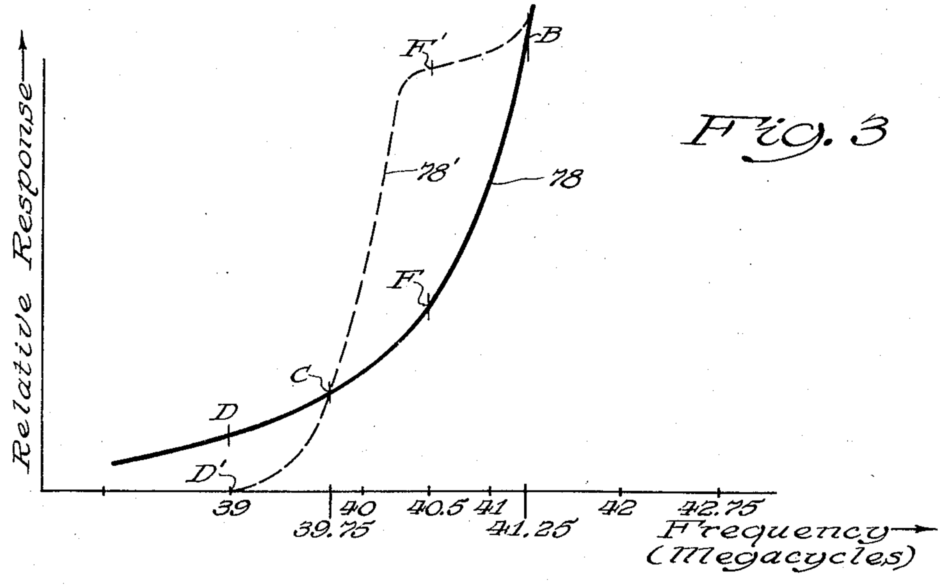
Figure 3 is an enlarged view of a portion of the curve shown in Figure 2.

Figure 3 is an enlarged view of the bottom part of the lower-frequency skirt 78 of the response characteristic shown in Figure 2. In Figure 3, the solid line 78 indicates the typical, normal shape of the response curve in this region, and the dotted line 78′ indicates a modified shape of the response curve as more fully discussed below. It will be seen that response curve 76 establishes a pass-band for frequencies, in this instance, extending approximately between 41 and 46 megacycles. The response is very low above and below the pass-band. In the present embodiment, it is within the range between 39 and 41.25 megacycles that the invention is primarily concerned, and it is this range which therefore is expanded in Figure 3.

In operation, the intermediate-frequency composite television signals from oscillator-converter 10 are amplified successively by amplifying devices 25, 42, and 75 and then are applied to second detector 15 in the usual manner. In the first and third stages comprising amplifying devices 25 and 75, the operation is entirely conventional.

It should be noted that the second stage amplifying device 42 is connected in series with first stage device 25; a D.C. path is provided from anode 30 to cathode 41. As a result, the automatic gain control potential applied to grid 27 of device 25 by way of resistor 44 is also effective to control the operation of device 42. That is, for example, a negative-going control potential applied to grid 27 has the effect of also applying a negative-going signal to grid 45; thus, the AGC potential is applied to both devices 25 and 42 in the same phase. Therefore, under strong received signal conditions when the negative automatic gain control potential is relatively large, the gain or transconductance of device 42, as well as that of device 25, is reduced. On the other hand, under weak signal conditions, a less strongly negative control potential is developed and consequently device 42 is biased to a higher gain state; that is, under weak signal conditions, the transconductance of device 42 is relatively high.

As so far described, the mode of operation is no different than in conventional television receivers of the prior art. As shown in Figure 2, the response characteristic of amplifier 14 normally is adjusted so that, upon the proper setting of tuning control 13, the most satisfactory image is reproduced when the video carrier falls part way down on skirt 77 at the high-frequency portion of the response characteristic. This is illustrated on the typical response curve as being at point A. Under this condition, the sound carrier, 4.5 mcs. away, falls well down on the opposite skirt 78 as indicated at point B. In this example, the video carrier is tuned to approximately 45.75 mcs. Under these tuning conditions, the video carrier of the adjacent channel falls at point C or 39.75 mcs. As is known in the art, a tuned circuit or trap tuned to 39.75 mcs. may be included somewhere in the intermediate-frequency amplifier to prevent passage of these adjacent video signals.

Attention is now directed to inductor 54 and capacitor 55 connected in the cathode circuit of device 42 and constituting a frequency-selective network. In accordance with the invention, this network forms a frequency-selective system that coacts with device 42 and the automatic gain control system to boost the response of amplifier 14 over a certain portion of its response characteristic during weak signal reception. In the present example, inductor 54 and capacitor 55 form a parallel-resonant circuit tuned to 39.0 mcs. (point D on Figures 2 and 3). The utility of this frequency-selective network stems from the fact that, under very weak signal conditions, such as occur in so-called fringe area reception, a somewhat better image display is obtained by slightly de-tuning oscillator-converter 10; that is, when tuning control 13 is adjusted to obtain what appears to be the best picture, the video carrier intermediate frequency is actually changed so that it falls higher on the response curve. This de-tuned video carrier frequency herein is 45.0 mcs. as indicated at point E in Figure 2. At the same time, because of the fixed 4.5 mcs. intercarrier spacing, the sound carrier then is moved further down on the lower-frequency skirt 78 and is de-tuned to 40.5 mcs. as indicated at point F in Figures 2 and 3. It will be noted that, although a better picture may be obtained, the response of the amplifier to the sound carrier is much lower; under such conditions, it has been found that poor sound reproduction often results.

However, with the invention, during weak signal conditions the response of amplifier 14 is boosted in the portion of the response characteristic to which the sound carrier is tuned when the set is readjusted as above described. That is, the response of the amplifier to a frequency of 40.5 mcs. is boosted. In this example, the response of the amplifier in the lower part of the response characteristic under weak signal conditions is illustrated by the dotted line 78′ in Figure 3. Thus, the 40.5 mcs. sound carrier response is increased from point F to point F′.

At the same time, the frequency-selective network comprising inductor 54 and capacitor 55 also serves to reduce the amplifier response in another portion of the response characteristic. This feature is utilized herein to provide adjacent-channel video-signal rejection. As the sound carrier is displaced from 41.25 mcs. to 40.5 mcs., the adjacent video signal is also displaced from 39.75 mcs. to 39 mcs. The frequency-selective network, which is tuned to approximately 39 mcs., causes a reduction in the response (from point D to point D′ in Figure 3) at the displaced adjacent video carrier frequency, while at the same time providing the desired boost at 40.5 mcs. (from point F to point F′). For purposes of definition, the lower portion of the response characteristic is that portion which is boosted under weak signal conditions, and the frequency at which the network reduces the response is considered as falling without the lower portion; thus the lower portion begins slightly above 39.0 mcs. and extends to between 41 and 42 mcs.

The action of this frequency-selective cathode network may be explained as follows: At resonance (39 mcs.) the network presents a high impedance which is substantially resistive. Since this resistive impedance is in common with portions of both the input and output circuits of device 42, the second stage including device 42 is degenerative at this frequency. Consequently, the gain at the resonance frequency is very low; the network effectively eliminates the adjacent video carrier when it is detuned to the resonant frequency (39.0 mcs.). However, at frequencies increasing upwardly from the resonant frequency, the network becomes capacitive. When the network becomes highly capacitive, at frequencies well above 39.0 mcs., it acts as a by-pass for the signals and, consequently, has a negligible effect on the gain at the higher frequencies. It is within the lower portion of the response characteristic that the network is effective to boost the response under weak signal conditions; as illustrated in Figure 3, the network is effective at frequencies varying in magnitude from slightly greater than 39.0 mcs. to approximately 41 to 42 mcs.

Within the effective frequency range of the network, at the detuned 40.5 mcs. sound carrier frequency for example, the effect of the network on the shape of the response characteristic varies with the gain or transconductance of the device 42 with which it coacts. At 40.5 mcs., the resultant capacitive impedance of the network is effective to cause a leading phase shift of the signal currents flowing in the common portion of the input and output signal circuits. This phase shift of the 40.5 mcs. signal currents effects regeneration in the stage at this frequency with the result that the response is correspondingly boosted.

However, the amount of regeneration or degeneration caused by the network, and hence the respective amount of boost or reduction in the response, is dependent upon the transconductance of device 42. During strong signal conditions when the automatic gain control potential is relatively high, the transconductance of device 42 is correspondingly low. Under these conditions, the network exerts but little effect on the shape of the response characteristic; the shape of the curve follows the solid line 78 in Figure 3. But during weak signal conditions when the automatic gain control potential is relatively low, the transconductance or gain of device 42 is correspondingly high. Under the high transconductance conditions, the leading 40.5 mcs. signal currents are greatly amplified and the response is correspondingly boosted at the 40.5 mcs. frequency.

Care must be taken that the amount of boost is not so great as to in fact cause oscillations under weak signal conditions. With present day tubes, it has been found that the Q of the network may need to be relatively low in order to prevent the attainment of too much boost. In a typical commercial amplifier, the Q was lowered by winding inductor 54 with resistance wire, the inductor resistance being 5 ohms. Device 42 was a type 3CB6 electron tube, capacitor 55 had a value of 16 micromicrofarads, and inductor 54 had a value of 1 microhenry.

To summarize the principal result, under normal or strong signal conditions, the shape of the response characteristic is as shown in the solid line 78 in Figure 3, so that normal adjustment of tuning control 13 results in satisfactory reproduction of both sound and video information. Yet, upon the occurrence of weak signal conditions, the frequency-selective network comprising inductor 54 and capacitor 55 boosts the response at 40.5 mcs. (dotted curve 78′) so that when the picture carrier is de-tuned to obtain best picture reproduction, the sound carrier still is amplified at a proper level for satisfactory reproduction.

Figure 4:
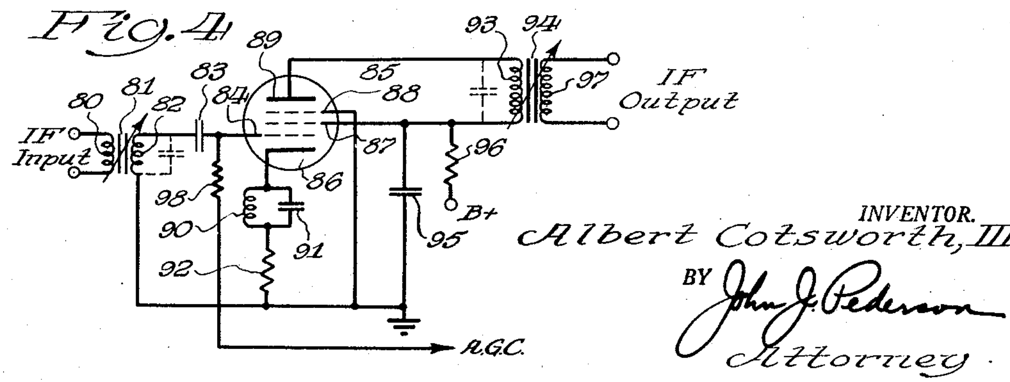
Figure 4 is a schematic representation of a modified form of the invention.

The single-stage amplifier shown in Figure 4 illustrates a simplified embodiment of the invention. In this instance, the intermediate-frequency composite video signal is applied across the primary winding 80 of an input transformer 81. The transformer secondary winding 82 is connected between ground and, through a coupling condenser 83, a control electrode 84 of an amplifying device 85 which preferably is an electron-discharge device of the pentode type. Amplifying device 85 further includes a cathode 86, a screen-grid 87, a suppressor-grid 88, and an anode 89. Cathode 86 is connected through a parallel-resonant circuit, comprising an inductor 90 and a capacitor 91, and a resistor 92 to ground, thus completing the input signal circuit for device 85. An output signal circuit extends in part between anode 89 and ground and comprises, in series-connection, a primary winding 93 of an output transformer 94 and a capacitor 95. The output signal circuit is completed through resistor 92 and the parallel resonant circuit to cathode 86. B+ is connected to anode 89 through a resistor 96 connected between primary winding 93 and condenser 95. The output from this stage is taken from a secondary winding 97 on transformer 94. The automatic gain control potential is applied to control electrode 84 through a resistor 98. Suppressor-grid 88 is connected directly to ground, and screen-grid 87 is connected to B+ through resistor 96 and bypassed to ground by capacitor 95.

Thus, a frequency-selective network comprising inductor 90 and capacitor 91 is connected in common with the input and output signal circuits of device 85. Since it is difficult to obtain a wide pass-band with only one stage, the stage shown in Figure 4 preferably cooperates with other intermediate-frequency amplifier stages so as to produce the desired response characteristic such as is illustrated in Figures 2 and 3.

The mode of operation of this stage including amplifying device 85 follows that above described for the stage including amplifying device 42. Under normal operating conditions, the video carrier is tuned to point A on the curve 76 shown in Figure 2, and, consequently, the sound carrier will fall at point B. However, when tuning control 13 is adjusted to place the video carrier at point E, the sound carrier then falls at point F. When this latter tuning is done during a time of weak signal reception, the frequency-selective network comprising inductor 90 and capacitor 91 coacts with device 85 and the automatic gain control system to boost the response in the lower portion of the response characteristic; the response is boosted at 40.5 mcs. so that the sound carrier amplitude is raised to the point indicated at F′ in Figure 3. At the same time, the frequency selective network serves as a trap at 39 mcs., reducing the response to the point indicated at D′, so as to reject adjacent-channel video signals.

Thus, the invention provides means coacting with the automatic gain control system and with an amplifying device controlled by that system for boosting the response in the sound portion of the amplifier response characteristic while reducing the response for de-tuned adjacent video carriers. The frequency-selective network is easily adapted to conventional circuitry and comprises only a simple and inexpensive inductor and a capacitor. The result is to insure satisfactory sound reproduction under weak signal conditions upon de-tuning for optimum picture reproduction.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. Signal-translating apparatus for amplifying a composite television signal including video-components amplitude-modulated on a first carrier-wave and sound-components frequency-modulated on a second carrier-wave always frequency-displaced from said first carrier-wave by a selected amount, said apparatus comprising: an amplifier including an amplifying device having an input signal circuit adapted to receive said signal and an output signal circuit, said amplifier having a response characteristic with first and second portions for respectively accepting said first and second carrier-waves; means responsive to variations in the strength of said signal and connected in said input circuit for varying the gain of said amplifying device inversely with said signal strength variations; and means connected in common with said input and output circuits and, upon the simultaneous occurrence of a decrease in said signal strength and a de-tuning of said apparatus to displace said second carrier-wave in a given direction away from the center of said response characteristic, coacting with said responsive means and said amplifying device for boosting the response of said amplifier in said second portion of said response characteristic and for decreasing the response of said amplifier at a frequency spaced in said given direction by a predetermined frequency interval beyond the displaced second carrier-wave frequency.

2. Signal-translating apparatus for amplifying a composite television signal including video-components amplitude-modulated on a first carrier-wave and sound-components frequency-modulated on a second carrier-wave always frequency-displaced from said first carrier-wave by a selected amount, said apparatus comprising: an amplifier adapted to receive said signal and having a response characteristic with first and second portions for respectively accepting said first and second carrier-waves; means responsive to the variations in strength of said signal for varying the gain of said amplifier inversely with said signal strength variations; and frequency-selective means for establishing a selected amount of degenerative feedback in said amplifier at a predetermined frequency falling without said second portion of said response characteristic to substantially reduce the amplifier response at said predetermined frequency, said frequency-selective means, upon the occurrence of a decrease in said signal strength, coacting with said responsive means and said amplifier for effecting regeneration in said amplifier and thereby boosting the response of said amplifier at frequencies slightly greater in magnitude than that of said predetermined frequency and falling within said second portion of said response characteristic.

3. Signal-translating apparatus for amplifying a composite television signal including video-components amplitude-modulated on a first carrier-wave and sound-components frequency-modulated on a second carrier-wave always frequency-displaced from said first carrier-wave by a selected amount, said apparatus comprising: an amplifier including an amplifying device having an input circuit adapted to receive said signal and an output signal circuit, said amplifier having a response characteristic for accepting said first and second carrier-waves; means responsive to variations in the strength of said signal and connected in said input circuit for varying the gain of said amplifying device inversely with said signal strength variations; a parallel-resonant circuit connected in common with said input and output circuits and tuned to a selected frequency and, upon the simultaneous occurrence of a decrease in said signal strength and a de-tuning of said apparatus to displace said second carrier-wave in a given direction away from the center of said response characteristic, coacting with said responsive means and said amplifying device for substantially reducing the response of said amplifier at said selected frequency while boosting the amplifier response at frequencies adjacent to and greater in magnitude than that of said selected frequency.

4. In a television system for amplifying a composite television signal including video-components amplitude-modulated on a first carrier-wave and sound-components frequency-modulated on a second carrier-wave always frequency-displaced from said first carrier-wave by a selected amount, said system comprising: an amplifier including an amplifying device having an input signal circuit adapted to receive said signal and an output signal circuit, said amplifier having a response characteristic with a pass-band of a frequency width approximating said selected amount, said response characteristic normally being shaped to tune said first and second carrier-waves to respective first and second frequencies falling on opposite skirts of said response characteristic; means including an automatic gain control system responsive to variations in the strength of said signal for varying the gain of said amplifying device inversely with said signal strength variations; a parallel-resonant network connected in common with said input and output circuits and tuned to a frequency displaced from the normal frequency of said second carrier-wave by a predetermined amount in a direction away from the center of said pass-band, said parallel-resonant network, upon a simultaneous decrease in said signal strength and a de-tuning of said television system to move said second carrier to a weak-signal frequency position between said displaced frequency and said normal second carrier-wave frequency, coacting with said automatic gain control system and said amplifier for boosting the response of said amplifier at frequencies located about said weak-signal frequency position; and means for selectively varying the frequencies of said carrier-waves to permit de-tuning of said second carrier-wave from said second frequency to a frequency between said displaced frequency and said normal second carrier frequency.

References Cited in the file of this patent

UNITED STATES PATENTS

| | | |
|---|---|---|
| 2,247,155 | Goodenough | June 24, 1941 |
| 2,773,119 | Parker | Dec. 4, 1956 |
| 2,845,483 | Massman | July 29, 1958 |